United States Patent [19]

Baudro et al.

[11] Patent Number: 4,683,110
[45] Date of Patent: Jul. 28, 1987

[54] APPARATUS AND METHOD FOR CONSOLIDATING SPENT FUEL RODS

[75] Inventors: Thomas O. Baudro, Gales Ferry; John S. Leonard, Lyme, both of Conn.

[73] Assignee: Proto-Power Corporation, Groton, Conn.

[21] Appl. No.: 745,409

[22] Filed: Jun. 14, 1985

[51] Int. Cl.$^4$ ............................................. G21C 19/00
[52] U.S. Cl. ................................... 376/261; 376/272; 29/400 N; 53/246; 206/443
[58] Field of Search ............... 376/272, 260, 261, 271; 250/506.1, 507.1; 29/400 N, 468; 53/246; 206/443

[56] References Cited

U.S. PATENT DOCUMENTS

| | | | |
|---|---|---|---|
| 3,920,512 | 11/1975 | Sutherland | 376/272 |
| 4,152,602 | 5/1979 | Kaminski et al. | 376/272 |
| 4,165,255 | 8/1979 | Knight | 376/272 |
| 4,177,386 | 12/1979 | Wachter et al. | 376/272 |
| 4,414,475 | 11/1983 | Kratz et al. | 250/506.1 |
| 4,474,727 | 10/1984 | Kmonk et al. | 376/272 |
| 4,482,520 | 11/1984 | Randazza | 376/261 |
| 4,487,741 | 12/1984 | Vuckovich et al. | 376/271 |
| 4,548,783 | 10/1985 | Dalke et al. | 376/260 |

FOREIGN PATENT DOCUMENTS

| | | | |
|---|---|---|---|
| 2944962 | 5/1981 | Fed. Rep. of Germany | 376/272 |
| 3320071 | 12/1984 | Fed. Rep. of Germany | 376/272 |
| 0031898 | 3/1979 | Japan | 376/272 |

Primary Examiner—Charles T. Jordan
Assistant Examiner—Daniel Wasil
Attorney, Agent, or Firm—Pasquale A. Razzano

[57] ABSTRACT

An apparatus for consolidating spent fuel rods from spent fuel assemblies includes a container with a bottom and front, back, and side walls. The container has a plurality of flutes positioned adjacent to the front wall, and the plurality of flutes defines a plurality of channels. The apparatus also includes a plurality of springs, which are mounted on a support. The springs bear against the flutes and the channels when no fuel rods have been inserted into the container and the support is located proximate the front wall. The springs assist in guiding a fuel rod into a preselected location in the container; the springs are capable of maintaining the fuel rod in the preselected location. Preferably, each spring is a resilient finger that extends outwardly from the support toward the front wall. The support may be a movable sheet. The apparatus advantageously includes a device for moving the support. Such a device may automatically position the support in response to control signals.

38 Claims, 13 Drawing Figures

APPARATUS AND METHOD FOR CONSOLIDATING SPENT FUEL RODS

BACKGROUND OF THE INVENTION

The present invention relates, in general, to nuclear power plants. More particularly, the present invention pertains to an apparatus in which spent fuel rods from spent fuel assemblies may be consolidated for storage and to a method for consolidating spent fuel rods.

In a nuclear power reactor, fuel rods are typically held in a fuel assembly by a grid structure, which positions the fuel rods so that they are spaced from one another. Once a fuel assembly has been sufficiently used in the nuclear reactor, it is removed from the nuclear reactor and usually stored in a fuel pool in the nuclear power plant. The spent fuel assembly is radioactive, emitting alpha, beta, and gamma radiation; consequently, it generates decay heat. The water in the fuel pool removes some decay heat through free circulation. The water in the fuel pool also provides some shielding from the radiation emitted by the spent fuel assemblies in the pool. The spent fuel assemblies are located with sufficient spacing between them to preclude criticality.

Fuel pools in existing nuclear power plants were typically designed to accommodate spent fuel assemblies for interim storage only. The expectation was that reprocessing plants would be in service and that the spent fuel assemblies would be sent to such plants. However, such plants have not yet become operational. Furthermore, facilities for long-term storage of spent fuel assemblies on a large-scale basis are presently nonexistent. Accordingly, spent fuel assemblies are being stored in the fuel pools of nuclear power plants, and the available storage space in such pools is rapidly being consumed.

In order to provide more storage space in their fuel pools, many nuclear power plants have installed, or intend to install, racks in their fuel pools that will permit the fuel assemblies to be stored closer together. These racks are typically equipped with sheets of shielding material located between the fuel assemblies. The sheets of shielding material enable the fuel assemblies to be stored closer together without becoming critical. Conventional fuel pool racks, however, generally have insufficient storage capacity to accommodate the spent fuel assemblies and rods that will accumulate during the lifetime of a nuclear power plant.

Accordingly, a need exists for an uncomplicated, inexpensive apparatus in which spent fuel rods from spent fuel assemblies may be consolidated for storage after they have decayed sufficiently. Moreover, a need exists for a simple, efficient method for consolidating spent fuel rods.

SUMMARY OF THE INVENTION

The present invention satisfies the need for an uncomplicated, inexpensive apparatus in which spent fuel rods may be consolidated for storage and the need for a simple, efficient method for consolidating spent fuel rods. The present invention solves the problems associated with known devices and methods by providing an apparatus with a container having a front wall, a back wall, side walls connected between the front and back walls, and a bottom connected to the front, back, and side walls. The container also has a plurality of flutes positioned adjacent to the front wall. The plurality of flutes defines a plurality of channels. Springs bear against the flutes and channels when no fuel rods have been inserted into the container and the springs are located proximate the front wall. The springs are capable of maintaining a fuel rod in a preselected location in the container. The springs are mounted to a support, which is positioned within the container and which is movable between the front and back walls.

Preferably, the springs are arranged in two or more rows, with the rows running between the side walls of the container. Each spring may be a resilient finger that extends outwardly from the support toward the front wall. The support may include a movable installation sheet, or it may include two or more plates. If the support includes two or more plates, the springs are advantageously arranged in two or more rows mounted on each of the plates. The flutes may be formed in the front wall; alternatively, the flutes may be formed in a stationary installation sheet that is positioned adjacent to the front wall.

An apparatus according to the present invention may include a device for moving the support. Such a device may have two plates and a plurality of resilient elements connected between the two plates. One of the plates abuts the support, while the other of the plates is connected to a mechanism for adjusting its position. Such a mechanism may include a pantograph extension device. Furthermore, such a mechanism advantageously includes a control system for automatically adjusting the position of the second plate, and therefore the position of the support, in response to a control signal.

An apparatus according to the present invention may include a plurality of resilient elements positioned between the support and the back wall instead of the device for moving the support. The resilient elements urge the support toward the front wall. The resilient elements may be wave-shaped springs, leaf springs, conical coil springs, or torsional springs. A further alternative to the device for moving the support is a device for producing a substantially constant force against the support means and urging the support means toward the front wall.

An apparatus according to the present invention desirably includes a frame that is capable of holding the container and at least one fuel assembly. In addition, holes are advantageously formed in the bottom of the container and in the walls of the container at a level above the level of an inserted fuel rod. The holes permit inserted rods to be convectively cooled. Preferably, the holes in the bottom of the container are aligned with the interstitial channels defined by fuel rods inserted into the container. The container optionally includes a removable cover.

The flutes and the channels of the container define a first row of locations along the front wall of the container. Accordingly, the container is packed by installing a first row of fuel rods in the first row of locations. The springs then bear against the first row of fuel rods and the flutes; the springs maintain the first row of fuel rods in position after the first row of fuel rods has been installed. The first row of fuel rods and the flutes define a second row of locations. Next, a second row of fuel rods is installed in the second row of locations. The springs then bear against the first row of fuel rods and the second row of fuel rods; the springs maintain the first and second rows of fuel rods in position after the second row of fuel rods has been installed. Preferably, fuel rods in the first row of fuel rods are in contact with the front wall, and fuel rods in the second row of fuel rods are in contact with fuel rods in the first row of fuel rods. Each row of fuel rods may be installed by inserting one fuel rod at a time into the container. In this manner, spent fuel rods from spent fuel assemblies may simply and efficiently be consolidated for storage.

BRIEF DESCRIPTION OF THE DRAWINGS

The above and other features and advantages of the present invention will become apparent upon consideration of the following detailed description of an illustrative embodiment thereof, especially when taken in conjunction with the accompanying drawings, wherein.

DETAILED DESCRIPTION OF THE PREFERRED EMBODIMENT

Figure 1:
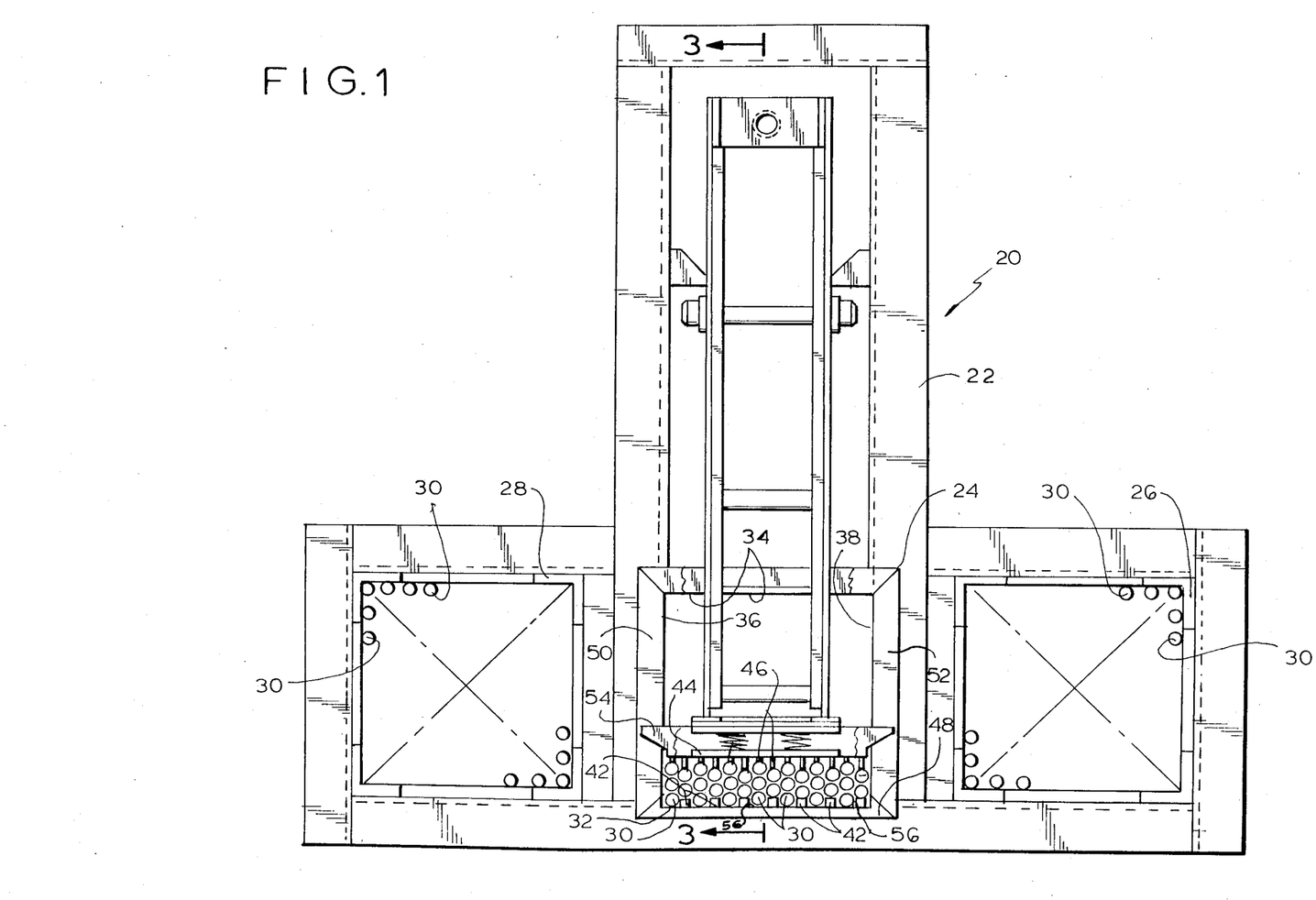
FIG. 1 is a top plan view of an apparatus according to the invention in which spent fuel rods may be consolidated.
Figure 2:
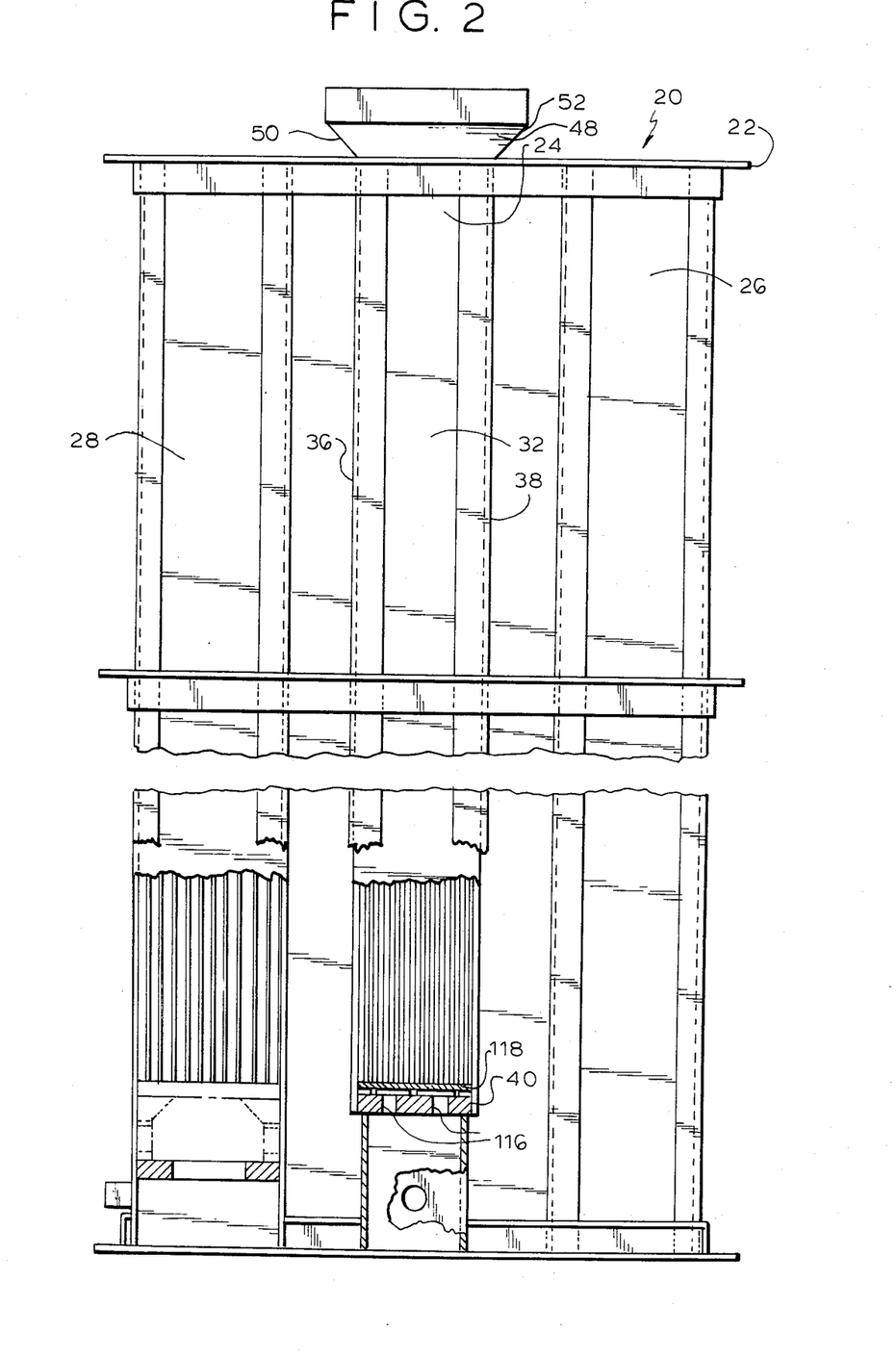
FIG. 2 is a front elevational view of the apparatus shown in FIG. 1.

Referring now to the drawings, and specifically to FIGS. 1 and 2, an apparatus 20 in which spent fuel rods may be consolidated is shown. Apparatus 20 has a frame 22 that holds a container 24 and two spent fuel assemblies 26 and 28. The latter assemblies are of generally conventional construction and are of the type used in previously proposed and existing storage systems. FIG. 1 shows that the fuel rods 30 are spaced in the spent fuel assemblies 26 and 28 in the conventional manner and that the fuel rods 30 are more densely packed in container 24 in accordance with the present invention.

Figure 3:
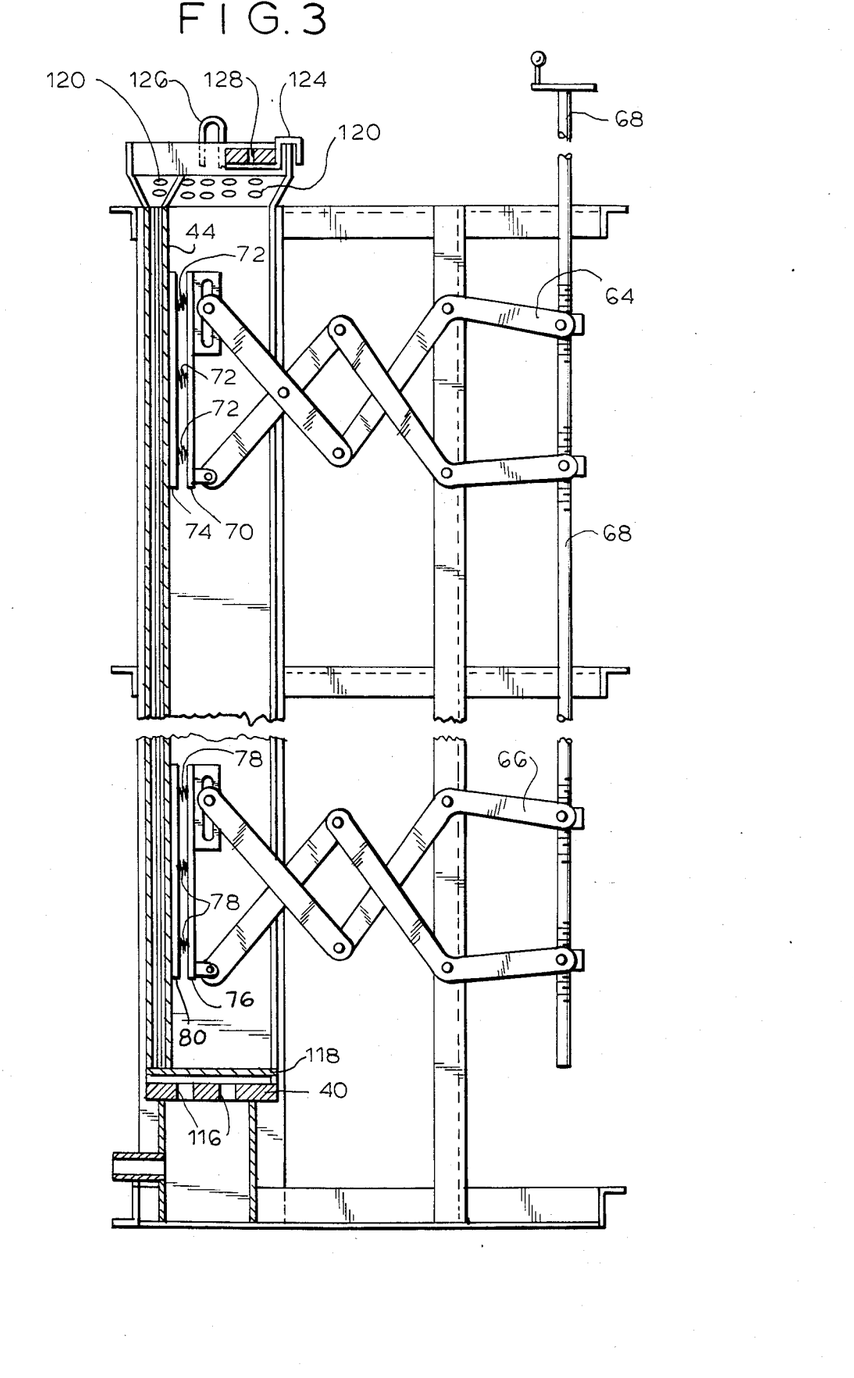
FIG. 3 is a sectional view taken along the line 3—3 of FIG. 1.

Container 24 has a front wall 32, a back wall 34, side walls 36, 38, and a bottom 40 (FIG. 3). The container 24 also has flutes 42 in the form of elongated vertically extending bars secured along the inner face of front wall 32. A moving installation sheet 44 is positioned within the container to move between front wall 32 and back wall 34. The moving installation sheet 44 supports a plurality of resilient fingers 46, which act as spring elements. Preferably, front wall 32 has an angular or inclined lip 48, the side walls 36 and 38 have angular lips 50 and 52, respectively, and the moving installation sheet 44 has an angular lip 54. As is explained in greater detail below, the angular lips 48, 50, 52, and 54 aid in guiding fuel rods into the container 24.

Figure 4:
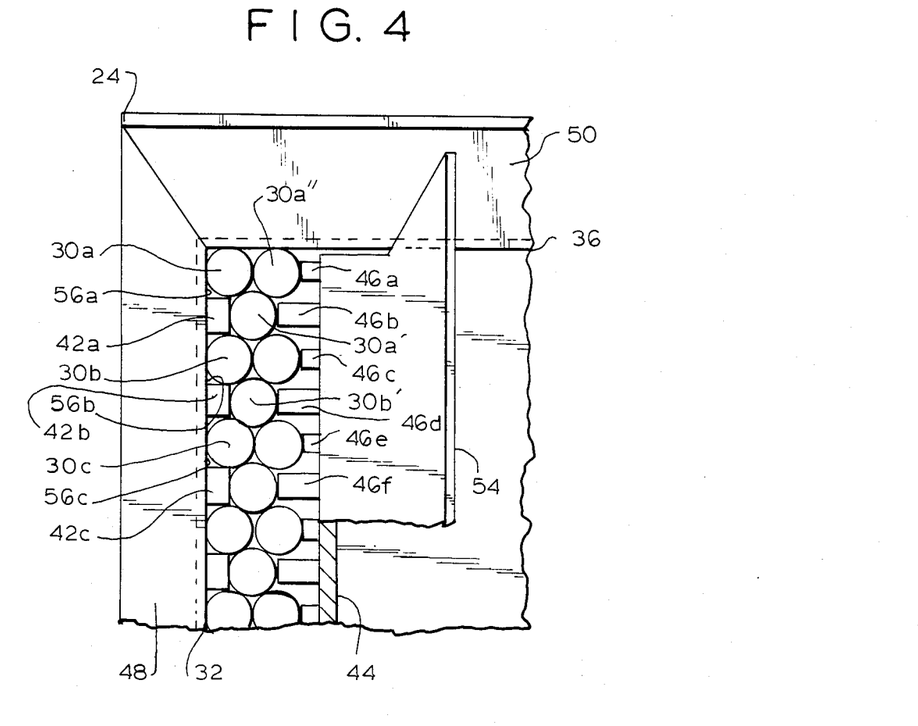
FIG. 4 is an enlarged top plan view of the container and installation sheet for the apparatus of FIG. 1, with parts broken away for clarity.
Figure 5:
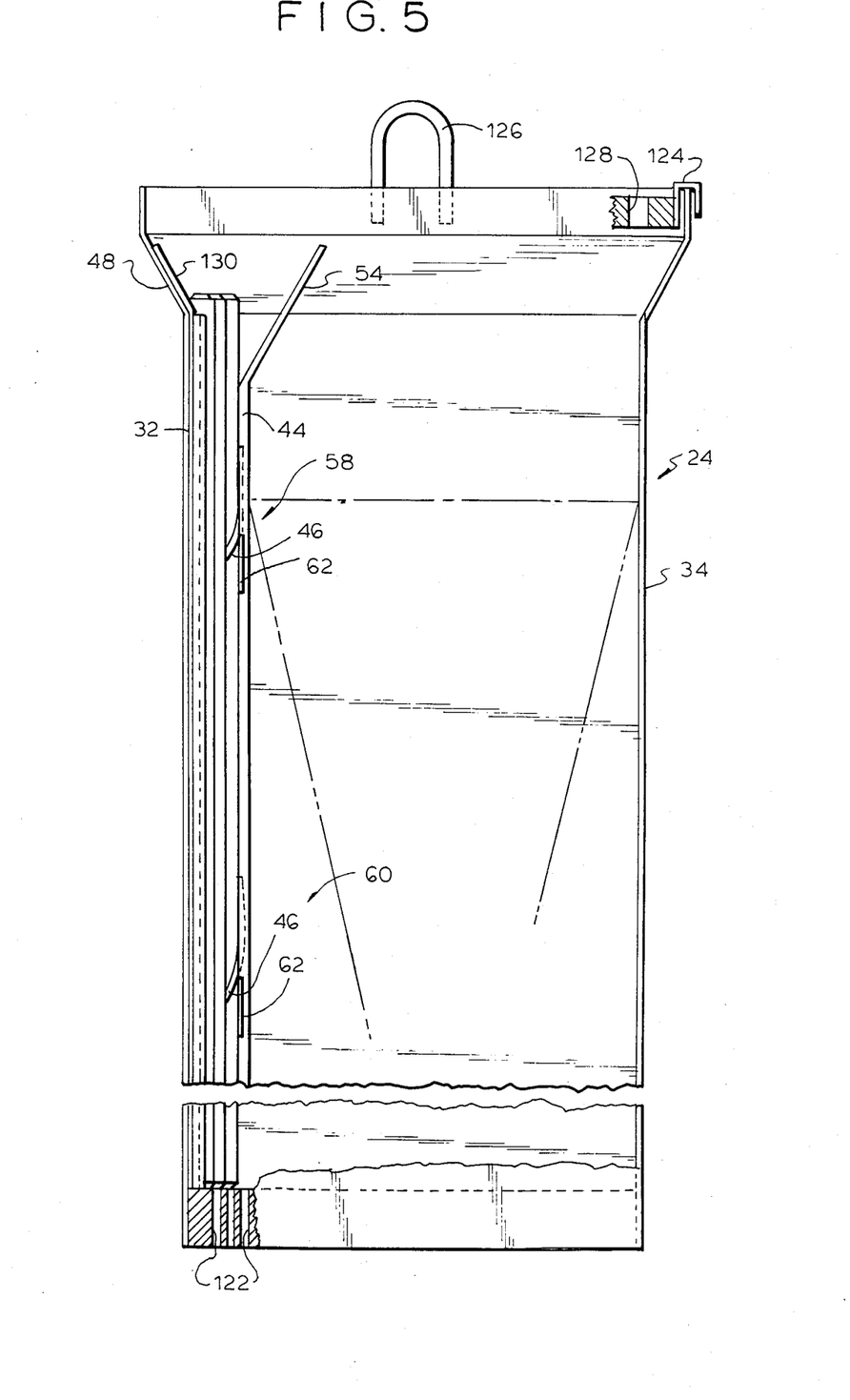
FIG. 5 is an enlarged sectional view similar to FIG. 3 of another embodiment of a container for an apparatus in which spent fuel rods may be consolidated.
Figure 6:
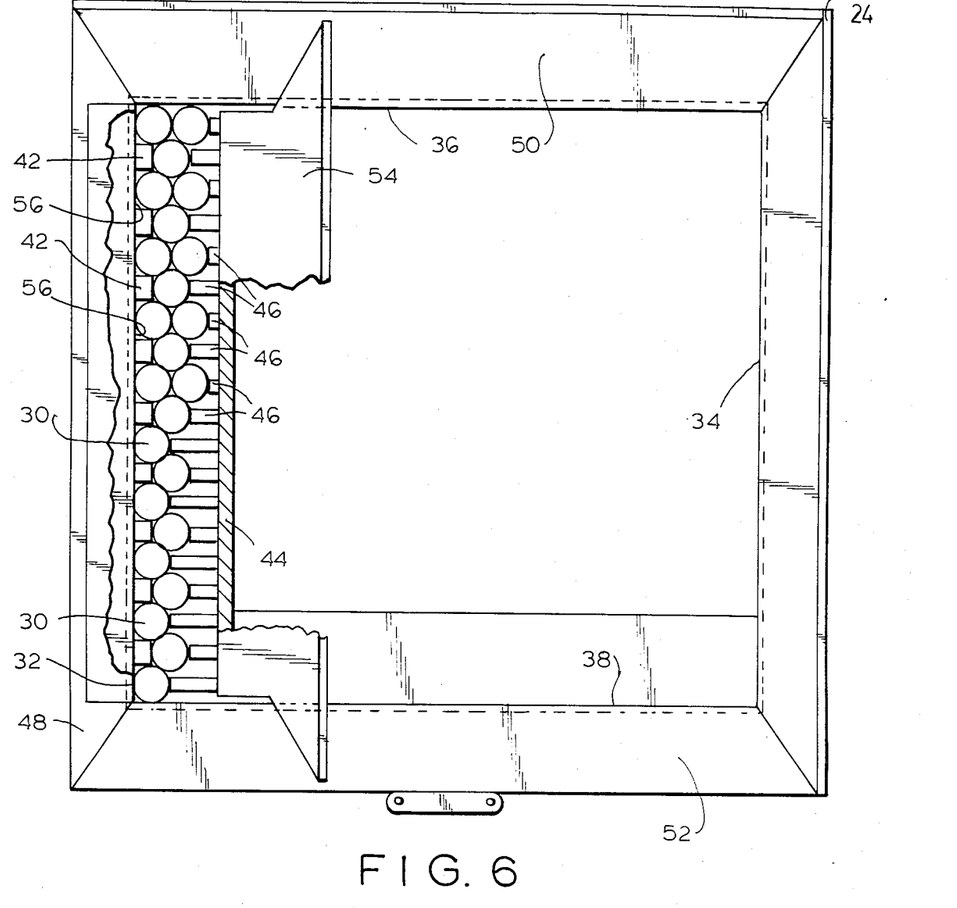
FIG. 6 is a top plan view of a container and an installation sheet for an apparatus in which spent fuel rods may be consolidated and illustrates a first row of rods adjacent to the front wall of the container, a second row of rods adjacent to the first row of rods, and a portion of a third row of rods.
Figure 12:
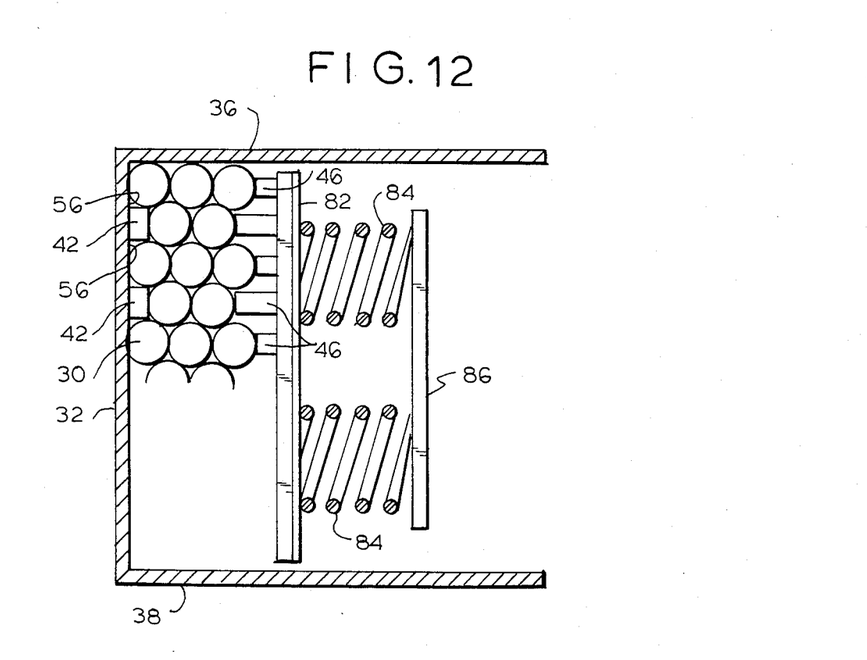
FIG. 12 is a sectional view similar to FIG. 6 of a further container for an apparatus in which spent fuel rods may be consolidated.

FIGS. 4, 6, and 12 depict the flutes 42 and the resilient fingers 46 in greater detail. As seen therein, flutes 42 define channels 56 therebetween. The resilient fingers 46 on sheet 44 extend outwardly therefrom toward front wall 32, as FIG. 5 illustrates. The resilient fingers 46 are aligned with flutes 42 and channels 56. Accordingly, when no fuel rods have been inserted into the container 24 and the moving installation sheet 44 is located proximate the front wall 32, the resilient fingers 46 bear against the flutes 42 and the channels 56.

In the embodiment of the invention shown in FIGS. 1, 3, 4, and 7 the flutes 42 are spaced from one another and positioned along front wall 32. But other arrangements are possible. For instance, in the embodiment shown in FIG. 5 a separate stationary installation sheet 130 is provided with the flutes being secured thereto. In this embodiment the stationary installation sheet 130 is positioned adjacent to the front wall 32.

The fuel rods 30 may be inserted one at a time into the container 24. A system for transferring spent fuel rods from spent fuel assemblies 26, 28 and consolidating the spent fuel rods into container 24 is shown in copending, commonly owned U.S. patent application Ser. No. 745,402, which was filed on June 14, 1985, the disclosure of which is hereby incorporated by reference. As disclosed therein, fuel rods 30 may be inserted in container 24 one at a time until a first row of fuel rods has been installed. After the first row of fuel rods has been installed, additional fuel rods 30 are inserted one at a time until a second row of fuel rods has been installed. This process is repeated until container 24 is full.

Preferably, fuel rods 30 are closely packed so that the maximum number of fuel rods are installed in the container 24. That is, the rods 30 are advantageously packed with their maximum density. The maximum density of the fuel rods is approximately twice the density of the fuel rods in a typical fuel assembly. This maximum density packing is achieved by installing fuel rods in the first row of fuel rods so that they are in contact with the front wall and by installing fuel rods in the second row of fuel rods so that they are in contact with fuel rods in the first row of fuel rods. Each succeeding row of fuel rods is installed so that fuel rods in it are in contact with fuel rods in the immediately preceding row. As is discussed in greater detail below, the fuel rods, even when they are packed with maximum density, define interstitial channels through which cooling water may flow.

More particularly, and with reference to FIG. 4, when no fuel rods have been inserted into the container 24 and the moving installation sheet 44 is proximate the front wall 32, the resilient fingers bear against the flutes and the channels, as mentioned above. Specifically, alternate resilient fingers 46a, 46c, and 46e bear against the channels 56a, 56b, and 56c, respectively, while resilient fingers 46b, 46d, and 46f bear against flutes 42a, 42b, and 42c, respectively. With the moving installation sheet 44 and the resilient fingers so positioned, fuel rod insertion may begin.

Initially, the first fuel rod in the first row of fuel rods, i.e., the fuel rod 30a, shown in the upper right corner of the container 24 in FIG. 4, is aligned for insertion. The flutes and the channels define a row of locations for the first row of fuel rods. The angular lips 48 and 50 aid in guiding the fuel rod 30a to its insertion position. During insertion, the fuel rod 30a is guided by the front wall 32, the side wall 36, the flute 42a, and the resilient finger 46a. The fuel rod 30a deflects the resilient finger 46a and urges it toward the moving installation sheet 44. The insertion of the fuel rod 30a causes the moving installation sheet 44 to move slightly toward the back wall. After fuel rod 30a has been inserted, the resilient finger 46a bears against the fuel rod 30a. However, the resilient fingers 46b, 46d, and 46f still bear against the flutes 42a, 42b, and 42c, respectively, and the resilient fingers 46c and 46e still bear against the channels 56b and 56c, respectively. The second fuel rod in the first row, i.e., the fuel rod 30b, is inserted in much the same manner. During insertion, fuel rod 30b is guided by front wall 32, flutes 42a and 42b, and resilient finger 46c. The fuel rod 30b deflects the resilient finger 46c and urges it toward the moving installation sheet 44. Again, the insertion of the fuel rod 30b causes the moving installation sheet 44 to move slightly toward the back wall. After fuel rod 30b has been inserted, resilient fingers 46a and 46c bear against fuel rods 30a and 30b, respectively. However, resilient fingers 46b, 46d, and 46f still bear against flutes 42a, 42b, and 42c, respectively, and the resilient finger 46e still bears against the channel 56c. The remainder of the fuel rods in the first row are inserted in a similar fashion. Once the first row of fuel rods has been installed, the resilient fingers bear against the fuel rods in the first row of fuel rods and against the flutes. The resilient fingers hold the fuel rods in position. The description below explains in detail that the moving installation sheet may be moved toward the back wall after a row of fuel rods has been installed.

After the first row of fuel rods has been installed, the second row of fuel rods may be installed. The fuel rods in the first row of fuel rods against wall 32 and the flutes 42 then define a row of locations for the second row of fuel rods. The first fuel rod in the second row of fuel rods, i.e., the fuel rod 30a', is guided during insertion by flute 42a, fuel rods 30a and 30b, and resilient finger 46b. The fuel rod 30a' deflects the resilient finger 46b and urges it toward the moving installation sheet 44. As with the fuel rods in the first row of fuel rods, insertion of fuel rod 30a' causes the moving installation sheet 44 to move slightly toward the back wall. After fuel rod 30a' has been inserted, resilient finger 46b bears against fuel rod 30a'. However, resilient fingers 46a, 46c, and 46e still bear against fuel rods 30a, 30b, and 30c, respectively, and resilient fingers 46d and 46f still bear against flutes 42b and 42c, respectively. Similarly, the second fuel rod in the second row of fuel rods, i.e., fuel rod 30b', and the other rods in this row may be installed. Once the second row of fuel rods has been installed, the resilient fingers bear against the fuel rods in the first and second rows of fuel rods. The resilient fingers hold the fuel rods in position.

After the second row of fuel rods has been installed, the third row of fuel rods may be installed. The fuel rods in the first row of fuel rods and the fuel rods in the second row of fuel rods define a row of locations for the third row of fuel rods. FIG. 4 illustrates the position of the moving installation sheet 44 after the first two rows and a portion of the third row of fuel rods have been installed, while FIG. 6 is a similar view and shows the last rod inserted in the portion of the third row.

After the last row of fuel rods has been installed, the moving installation sheet 44 may be removed or it may be left in place. Furthermore, if the container 24 is to be only partially filled, the moving installation sheet 44 may be locked in place by a suitable locking device in order to prevent the fuel rods from shifting or becoming damaged should a seismic incident occur.

FIG. 5 illustrates the moving installation sheet 44 with the resilient fingers being arranged in horizontal rows 58 and 60 running between the side walls of the container 24. The moving installation sheet 44 in FIG. 5 includes recesses 62 so that when the resilient fingers 46 are fully compressed they are pushed into the recesses 62. As a result, the outer surfaces of the resilient fingers 46 are flush with the surface of the moving installation sheet 44.

The resilient fingers may be formed as the teeth of a comb, which is fabricated from a resilient material. One or more combs may be mounted on the moving installation sheet to align the teeth, i.e., the resilient fingers, with the flutes and the channels. With reference to FIG. 5, the rows 58 and 60 may each consist of a comb with resilient teeth. Alternatively, the resilient fingers may be individual spring elements mounted on the moving installation sheet and aligned with the flutes and the channels.

FIG. 3 depicts one embodiment of a device for moving the moving installation sheet 44. The device is comprised of several pantographs, 64 and 66 two of which are depicted in FIG. 3, which are operated, i.e., extended or retracted each by the same amount, by a jackscrew 68. Although a manually operated jackscrew 68 is shown, jackscrew 68 may be driven by a motor.

Upper pantograph 64 is connected to a plate 70, which is connected through resilient elements, e.g. springs 72, to a plate 74. Similarly, the lower pantograph 66 is connected to a plate 76, which is connected through resilient elements 78 to a plate 80. The plates 74 and 80 abut the moving installation sheet 44. The pantographs 64 and 66, when operated by the jackscrew 68, position the plates 70 and 76, respectively. Consequently, the position of plates 74 and 80, and therefore the position of moving installation sheet 44, may be adjusted by operating jackscrew 68.

The arrangement of plates 70 and 74 and the resilient elements 72 may be termed a pressure pad. Similarly, the arrangement of the plates 76 and 80 and the resilient elements 78 may also be termed a pressure pad. Accordingly, the pantographs 64 and 66 and the jackscrew 68 are part of the pressure pad operating system.

Resilient elements 72 and 78 permit the force that is exerted on the inserted fuel rods to be controlled. As the fuel rods in a row of fuel rods are inserted into the container, they push the moving installation sheet toward the back wall, which compresses the resilient elements 72 and 78. However, the resilient elements 72 and 78 are selected so that, when they are compressed by a fully inserted row of fuel rods, they limit the force exerted on the fuel rods. This force is exerted on the fuel rods by the pressure pads through the moving installation sheet and the resilient fingers. The force exerted on the fuel rods should be limited to a value that does not cause damage to the fuel rods.

In preparation for the insertion of the fuel rods in the next row of fuel rods, the jackscrew 68 is operated to retract the pantographs 64 and 66, and thus permit the moving installation sheet to move toward the back wall of the container. While the pantographs 64 and 66 are being retracted and the moving installation sheet is moving toward the back wall, the resilient fingers spring forward, i.e., toward the front wall, and maintain the fuel rods in position.

Figure 13:
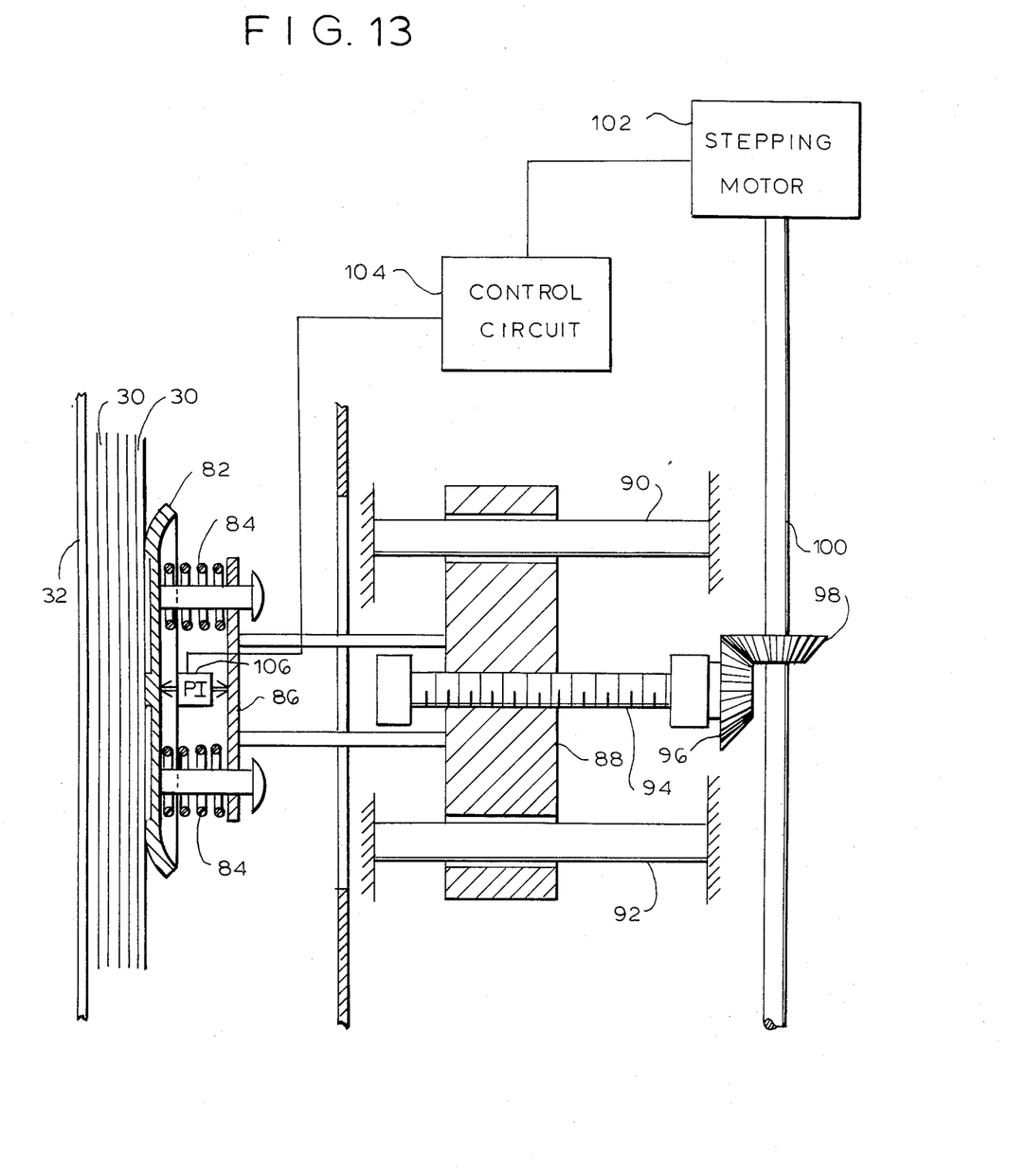
FIG. 13 is a diagrammatic illustration of a control system for moving the spring support of an apparatus in which spent fuel rods may be consolidated.

FIG. 13 illustrates a device for automatically positioning the spring support. As seen therein, the spring support in this embodiment is a plate or pad 82. One or more of such plates may be used instead of the moving installation sheet 44, and the resilient fingers 46 may be mounted directly on the plate or plates. FIGS. 12 and 13 show the plate 82 being connected through resilient elements, i.e. coil springs 84, to a plate 86. The plate 86 is connected to and positioned by a head 88, which travels along guides 90 and 92. The position of the head 88, and therefore the position of the plates 82 and 86, is adjusted by a jackscrew 94, which is connected through bevel gears 96, 98 and a shaft 100 to a stepping motor 102. The stepping motor 102 is controlled by a control circuit 104, which receives, as input signals, output signals from a position indicator 106. The position indicator 106 senses the position of the plate 82 with respect to the plate 86. If the plate 82 is too close to the plate 86, thereby signifying that a greater-than-desirable force is being exerted on the fuel rods, the position indicator 106 sends a signal to the control circuit 104. The control circuit 104 then operates stepping motor 102, causing plate 86, and therefore plate 82, to move toward back wall 34. This movement of the plates 82 and 84 decreases the force exerted on the fuel rods. However, some force is still exerted on the fuel rods by the resilient fingers 46, which maintain the fuel rods in position. The position indicator 106 could be arranged to provide the operator a visual indication and shaft 100 could be manually operated, thereby eliminating control circuit 104 and stepping motor 102.

Figure 8:
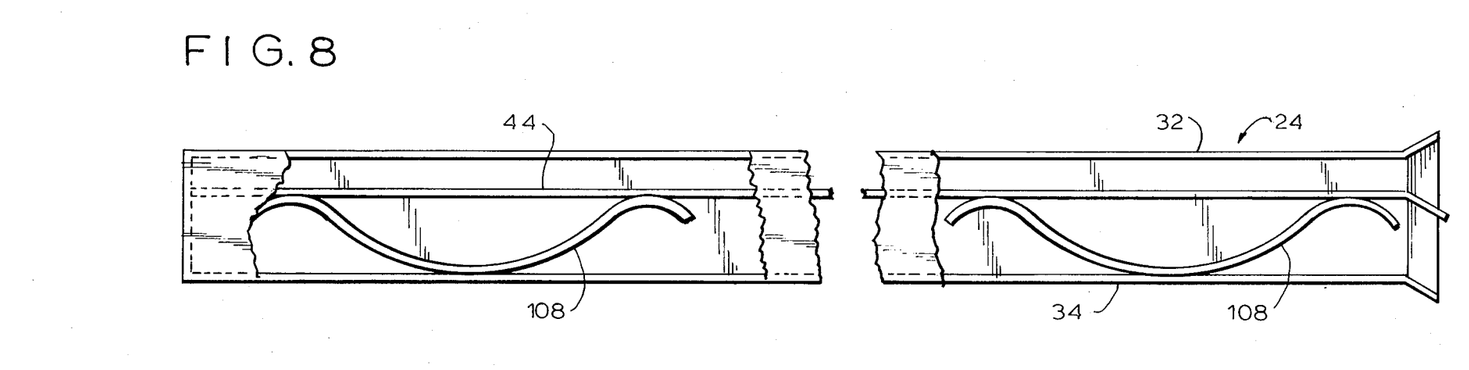
FIG. 8 is a sectional view similar to FIG. 3 of another embodiment of a container in which spent fuel rods may be consolidated, showing wave-shaped springs biasing an installation sheet toward the front wall of the container.
Figure 9:
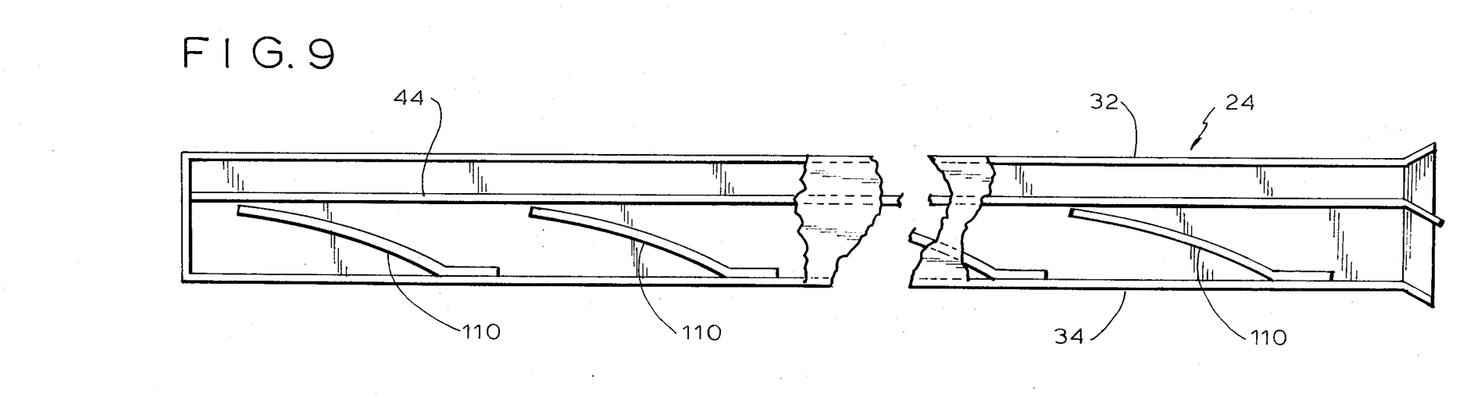
FIG. 9 is a sectional view similar to FIG. 3 of yet another embodiment of a container in which spent fuel rods may be consolidated, showing leaf springs biasing an installation sheet toward the front wall of the container.
Figure 10:
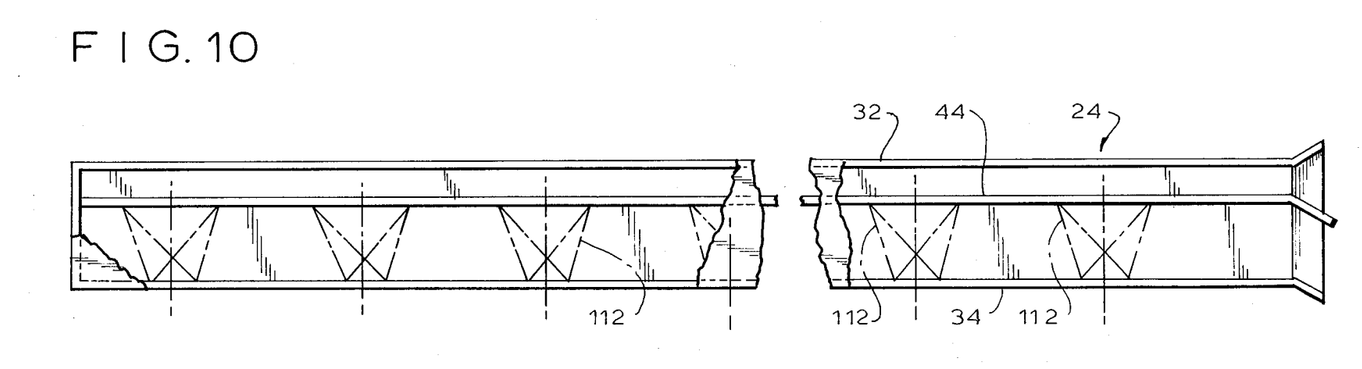
FIG. 10 is a sectional view similar to FIG. 3 of a further embodiment of a container in which spent fuel rods may be consolidated, schematically illustrating conical coil springs biasing an installation sheet toward the front wall of the container.
Figure 11:
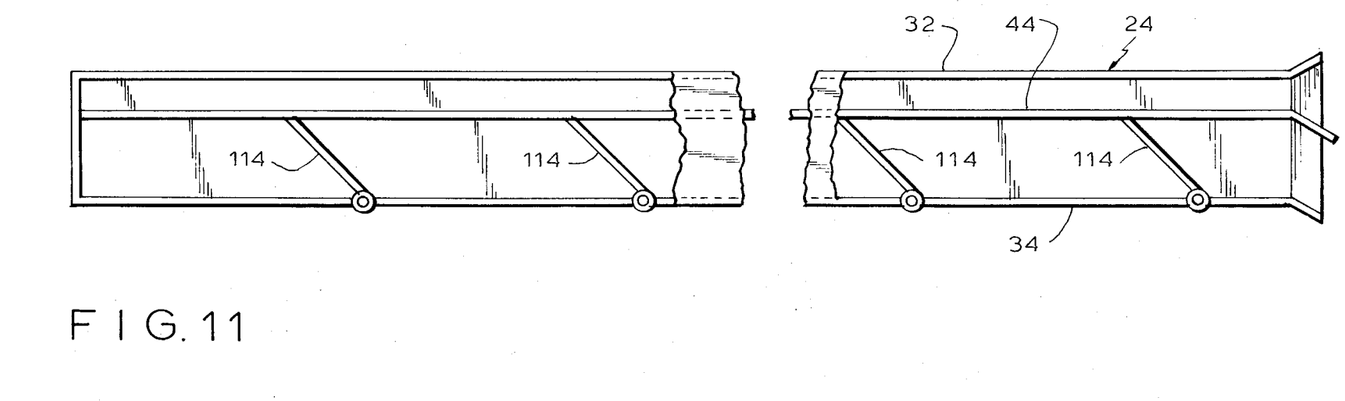
FIG. 11 is a sectional view similar to FIG. 3 of a still further embodiment of a container for an apparatus in which spent fuel rods may be consolidated, showing torsional springs biasing an installation sheet toward the front wall of the container.

Instead of a device for moving the spring support, an apparatus according to the present invention may include a number of resilient elements positioned between the spring support and the back wall of the container. The resilient elements urge or bias the spring support toward the front wall of the container. FIGS. 8–11, for example, illustrate such resilient elements positioned between the moving installation sheet 44 and the back wall 34. Each of these resilient elements urges the moving installation sheet 44 toward the front wall. FIG. 8 shows a plurality of wave-shaped springs 108. FIG. 9 shows a plurality of leaf springs 110. FIG. 10 schematically shows a plurality of conical coil springs 112. Finally, FIG. 11 shows a plurality of torsional springs 114. The line with long and short intervals in FIG. 5 schematically depicts a side elevational view of such resilient elements. The number of resilient elements, their shape and flexural cross section, and their mounting arrangement are selected so that they exert enough force on the spring support to keep it sufficiently erect and square within the container and so that fuel rod insertion is not hampered.

A further alternative to a device for moving the spring support is a plurality of elements that deform beyond their yield points. Deformation beyond the yield point results in an approximately constant force with displacement, which is a desirable design objective. Additional alternatives for a mechanism that exerts a constant force on the spring support are an arrangement of levers and weights or a convoluted bellows of an elastomeric material inflated to a constant pressure or a bladder with its pressure appropriately adjusted to compensate for bladder volume changes.

Figure 7:
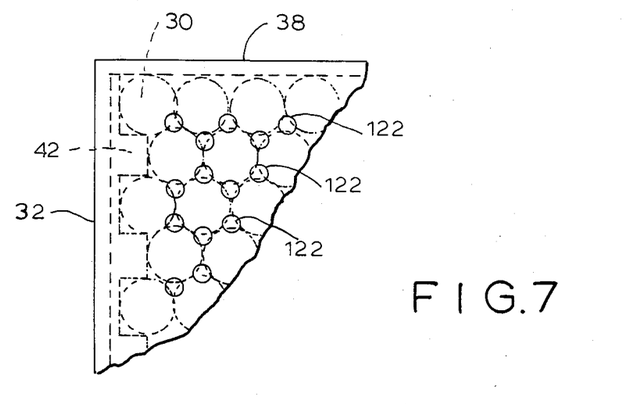
FIG. 7 is a bottom plan view of a container for an apparatus in which spent fuel rods may be consolidated and depicts holes in the bottom of the container that are aligned with the interstitial channels between inserted fuel rods.

Preferably, the container is constructed to permit the inserted fuel rods to be convectively cooled. FIGS. 2, 3, and 7 show holes that permit cooling water to flow past the fuel rods in the container. FIGS. 2 and 3 depict a plurality of holes 116 in the bottom 40 of container 24. A screen plate 118, which includes a multiplicity of holes (not shown), is positioned above the bottom 40. The holes in the screen plate 118 are smaller than the holes in the bottom 40. The screen plate 118 distributes the flow of water over the channels between the fuel rods. The container desirably includes a plurality of holes 120 in the front, back, and side walls located at a level above the level of the inserted fuel rods. In an alternative to the use of larger holes in the bottom and smaller holes in the screen plate, the screen plate may be eliminated, and a number of smaller holes may be formed in the bottom. FIGS. 5 and 7 illustrate such an arrangement in which the bottom of the container includes a plurality of holes 122. The holes 122 are advantageously aligned with the interstitial channels defined by the inserted fuel rods to reduce flow resistance and enhance convective cooling. As seen in the embodiment of FIGS. 2 and 3, the inserted fuel rods rest upon the screen plate 118, whereas in the embodiment of FIGS. 5 and 7, the inserted fuel rods rest upon the bottom.

The container optionally includes a removable cover 124 with a lifting attachment 126, as seen in FIGS. 3 and 5. In order to facilitate cooling of the fuel rods, the cover 124 has a plurality of holes 128.

As a result of this construction of the invention, spent fuel rods can be packed for storage in a water pool to approximately double the density of existing conventional storage arrangements, thereby doubling the storage capacity of such pools without structurally changing the pools themselves.

Although a particular illustrative embodiment of the present invention has been described herein with reference to the accompanying drawings, the present invention is not limited to that particular embodiment. Various changes and modifications may be made thereto by those skilled in the art without departing from the spirit or scope of the invention, which is defined by the appended claims.

We claim:

1. An apparatus for consolidating spent fuel rods from spent fuel assemblies, comprising:
   a container having a front wall, a back wall, side walls connected between the front and back walls, a bottom, and a plurality of stationary flutes along the front wall, the plurality of stationary flutes defining a plurality of channels along the front wall, each channel being sized to accept a fuel rod, the flutes and the channels being stationary;

a plurality of springs, the springs being aligned with and bearing against the flutes and the channels when no fuel rods have been inserted into the container and the springs are located proximate the front wall, each spring being capable of maintaining a fuel rod in a preselected location in the container;

support means located within the container for supporting the springs, the support means being movable within the container in a substantially horizontal direction between the front and back walls of the container; and positioning means for positioning the support means between the front and back walls of the container, the positioning means permitting the support means to take nondiscrete positions between the front and back walls.

2. An apparatus as defined in claim 1, wherein the springs are arranged in a first row and a second row running between the side walls.

3. An apparatus as defined in claim 1, wherein each of the springs is a resilient finger, each finger extending outwardly from the support means toward the front wall.

4. An apparatus as defined in claim 1, wherein the support means includes a sheet and the springs are mounted on the sheet.

5. An apparatus as defined in claim 1, wherein the support means includes a first plate and a second plate, said springs being mounted on the first and second plates.

6. An apparatus as defined in claim 5, wherein the springs are arranged in a first row and a second row, the first row being mounted on the first plate and the second row being mounted on the second plate.

7. An apparatus as defined in claim 1, wherein said flutes are formed in the front wall.

8. An apparatus as defined in claim 1, wherein said flutes are formed in a sheet and the sheet is positioned adjacent to the front wall.

9. An apparatus as defined in claim 1, wherein the front and side walls each have an angular lip.

10. An apparatus as defined in claim 9, wherein the support means includes a sheet with an angular lip.

11. An apparatus as defined in claim 1, further comprising means for locking the positioning means in a position between the front and back walls.

12. An apparatus as defined in claim 1, wherein the positioning means includes a first plate and a second plate, a plurality of resilient elements being connected between the first plate and the second plate, the first plate abutting the support means, and adjusting means connected to said second plate for adjusting the position of the second plate.

13. An apparatus as defined in claim 12, wherein the adjusting means includes a pantograph.

14. An apparatus as defined in claim 12, wherein the adjusting means includes means for automatically adjusting the position of the second plate in response to a control signal.

15. An apparatus as defined in claim 1, wherein the bottom has a plurality of holes formed therein permitting water to flow through fuel rods inserted in the container.

16. An apparatus as defined in claim 15, wherein the holes are aligned with interstitial channels defined by fuel rods inserted in the container.

17. An apparatus as defined in claim 15, wherein the front, back, and side walls each have a plurality of holes, the holes in the walls being located at a level above the level of an inserted fuel rod.

18. An apparatus as defined in claim 15, further comprising a screen plate with a multiplicity of holes, the screen plate being positioned between the bottom and an inserted fuel rod.

19. An apparatus as defined in claim 1, wherein the positioning means includes a plurality of resilient elements, the resilient elements being positioned between the support means and the back wall, the resilient elements urging the support means toward the front wall.

20. An apparatus as defined in claim 19, wherein each resilient element is a wave-shaped spring.

21. An apparatus as defined in claim 19, wherein each resilient element is a leaf spring.

22. An apparatus as defined in claim 19, wherein each resilient element is a conical coil spring.

23. An apparatus as defined in claim 19, wherein each resilient element is a torsional spring.

24. An apparatus as defined in claim 1, wherein the positioning means includes means for producing a substantially constant force against the support means and for urging the support means toward the front wall.

25. An apparatus as defined in claim 1, further comprising a frame, the frame being capable of holding the container and at least one fuel assembly.

26. An apparatus as defined in claim 1, further comprising a removable cover for the container.

27. An apparatus as defined in claim 26, wherein the cover includes a plurality of holes.

28. A method for packing spent fuel rods in an apparatus including a container having a front wall, a back wall, side walls connected between the front and back walls, the container also having a plurality of stationary flutes positioned adjacent to the front wall, the plurality of flutes defining a plurality of channels, the flutes and channels defining a first row of locations along the front wall, the apparatus also including a plurality of springs and support means for supporting the plurality of springs, the springs being aligned with and bearing against the flutes and the channels when no fuel rods have been inserted into the container and the support means is located proximate the front wall, comprising the steps of:

installing a first row of fuel rods in the first row of locations, the springs bearing against the first row of fuel rods and the flutes, the springs maintaining the first row of fuel rods in position after the first row of fuel rods has been installed, the first row of fuel rods and the flutes defining a second row of locations;

installing a second row of fuel rods in the second row of locations, the springs bearing against the first row of fuel rods and the second row of fuel rods, the springs maintaining the first and second rows of fuel rods in position after the second row of fuel rods has been installed, the first and second rows of fuel rods defining a third row of locations, the first row of fuel rods being located between the associated springs and the channels, the second row of fuel rods being located between the associated springs and the flutes, whereby the third row of locations is defined by the first and second rows of fuel rods; and permitting the support means to take nondiscrete positions between the front and back walls of the container.

29. A method as defined in claim 28, further comprising the step of installing a third row of fuel rods in the third row of locations, the springs bearing against the second row of fuel rods and the third row of fuel rods, the springs maintaining the first, second, and third rows of fuel rods in position after the third row of fuel rods has been installed.

30. A method as defined in claim 28, further comprising the steps of:

moving the support means toward the back wall after the first row of fuel rods has been installed; and moving the support means toward the back wall after the second row of fuel rods has been installed.

31. A method as defined in claim 30, wherein the first moving step includes automatically moving the support means toward the back wall after the first row of fuel rods has been installed in response to a first control signal, and wherein the second moving step includes automatically moving the support means toward the back wall after the second row of fuel rods has been installed in response to a second control signal.

32. A method as defined in claim 28, further comprising the step of removing the support means and the springs after a last row of fuel rods has been installed.

33. A method as defined in claim 28, further comprising the step of convectively cooling the fuel rods in the container.

34. A method as defined in claim 28, further comprising the step of locking the support means in a position between the front and back walls.

35. A method as defined in claim 28, wherein, after the first installing step, fuel rods in the first row of fuel rods are in contact with the front wall, and wherein, after the second installing step, fuel rods in the second row of fuel rods are in contact with fuel rods in the first row of fuel rods.

36. A method as defined in claim 28, wherein each installing step includes inserting one fuel rod at a time into the container.

37. A method as defined in claim 30, wherein the first moving step includes manually moving the support means toward the back wall after the first row of fuel rods has been installed and after a first sensory perceptible indication has been received, and wherein the second moving step includes manually moving the support means toward the back wall after the second row of fuel rods has been installed and after a second sensory perceptible indication has been received.

38. A method as defined in claim 28, wherein the first installing step includes installing the rods such that a rod in the first row of fuel rods is spaced apart from adjacent rods in the first row of fuel rods and wherein the second installing step includes installing the rods such that a rod in the second row of fuel rods is spaced apart from adjacent rods in the second row of fuel rods.

* * * * *